Oct. 1, 1963 L. D. STEVENS ETAL 3,105,963

TRANSDUCER POSITIONING SYSTEM

Filed Feb. 27, 1959

2 Sheets-Sheet 1

INVENTORS
LOUIS D. STEVENS
JOHN B. CLARK

BY Walter J. Madden Jr.

ATTORNEY

Oct. 1, 1963 L. D. STEVENS ET AL 3,105,963

TRANSDUCER POSITIONING SYSTEM

Filed Feb. 27, 1959 2 Sheets-Sheet 2

United States Patent Office 3,105,963

Patented Oct. 1, 1963

3,105,963

TRANSDUCER POSITIONING SYSTEM

Louis D. Stevens, San Jose, and John B. Clark, Santa Clara County, Calif., assignors to International Business Machines Corporation, New York, N.Y., a corporation of New York Filed Feb. 27, 1959, Ser. No. 796,113
3 Claims. (Cl. 340—174.1)

Figure 1:
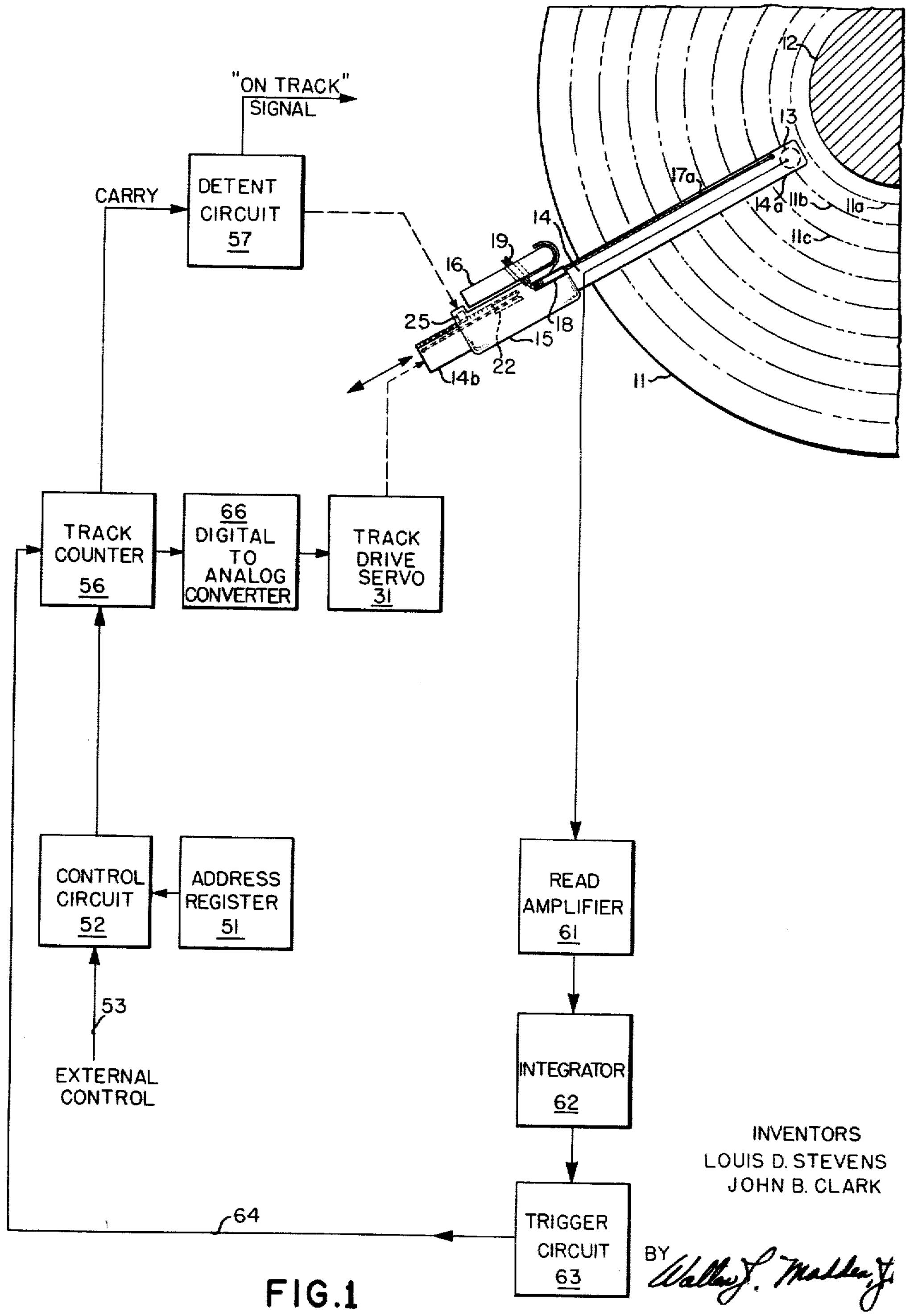

This invention relates in general to magnetic recording systems, and relates more particularly to such systems wherein means are provided for selectively positioning a magnetic transducer adjacent selected portions of a magnetic recording medium.

In machines of the type disclosed in copending application Serial No. 477,468, filed December 24, 1954, a magnetic transducer is selectively positionable in two dimensions adjacent one of a plurality of rotating disc members. The disc members rotate on a vertical axis, and each of them have a plurality of recording tracks or channels on each of their sides. For cooperation with the recording medium, the transducer is first positioned vertically to the desired one of the discs, and is then positioned horizontally between discs to the selected track on the selected disc. In such a system, it is desirable to position the transducer to the selected recording track in as short a time as possible and with the greatest possible accuracy. Heretofore, the positioning of the transducer in the horizontal dimension to the desired one of the tracks on the selected disc has been controlled by means including a potentiometer whose resistance varied as a function of the horizontal position of the transducer. The signal from the potentiometer was then compared with a signal representing the desired horizontal position of the transducer and the resulting difference was ultilized to drive a servo system to position the transducer at the desired track.

In accordance with the present invention, the positioning of the transducer to a selected track on a given disc is controlled by first positioning the transducer at a reference position and then sequentially driving it across the different tracks. Each of these crossings of the different tracks by the transducer is counted by said transducer actually sensing the tracks as they are crossed, and this count of the number of tracks crossed is compared with a count representing the number of tracks which must be crossed before the desired track is reached. When the number of tracks actually crossed corresponds to the desired number of tracks to be crossed, indicating that the transducer is at the desired location, the drive system is stopped and the recording or reproducing operation may then take place. By actually counting the number of tracks crossed by the transducer, the present invention provides much more reliable control of the positioning of the transducer, since this control is actuated by a direct manifestation of the tracks, i.e., their actual crossing, rather than by a more indirect indication, such as the voltage across a potentiometer whose resistance varies as a function of the transducer position.

As an additional feature of the present invention, the signal which is generated in response to a difference between the number of tracks crossed by the transducer and the number of tracks to be crossed may be made a function of the magnitude of this difference between these two quantities, thus providing a drive signal which is a function of the required amount of movement of the transducer. That is, if at any instant the number of tracks actually crossed by the transducer in the positioning operation is considerably less than the number of tracks which must be crossed by the transducer before it reaches its desired position, indicating that the transducer must still move a considerable distance before reaching the desired position, the drive signal generated by the present invention is relatively large so as to provide maximum driving force to the transducer drive mechanism. On the other hand, at any instant when the difference between the number of tracks crossed by the transducer in its positioning operation and the number of tracks to be crossed by the transducer is quite small, indicating that the transducer is near the desired position, the drive signal generated in the present invention is relatively small so as to accurately position the transducer at the desired track without overshooting.

It is therefore an object of the present invention to provide improved apparatus for positioning a transducer relative to a selected one of a plurality of magnetic recording tracks.

It is a primary object of the present invention to provide apparatus for positioning a transducer relative to a selected one of a plurality of adjacent recording tracks wherein the transducer is to ultimately record or reproduce data in conjunction with the selected track, the transducer being driven transversely of the recording tracks and the crossing of each track by the transducer is sensed by said tranducer and is counted and compared with the number of crossings which must occur to position the transducer at the desired track, and the result of this comparison is utilized to position the transducer at the desired track.

It is a further object of the present invention to provide apparatus for positioning a transducer relative to a plurality of adjacent magnetic recording tracks in which the transducer is driven transversely of said tracks to produce a signal for each crossing of a track, and this signal is compared with a signal representing the number of crossings which must occur before the transducer reaches the desired track to produce a transducer drive signal having a magnitude dependent upon the difference between the number of tracks actually crossed by the transducer and the number of tracks which must be crossed by the transducer prior to its reaching its desired position.

Figure 2:
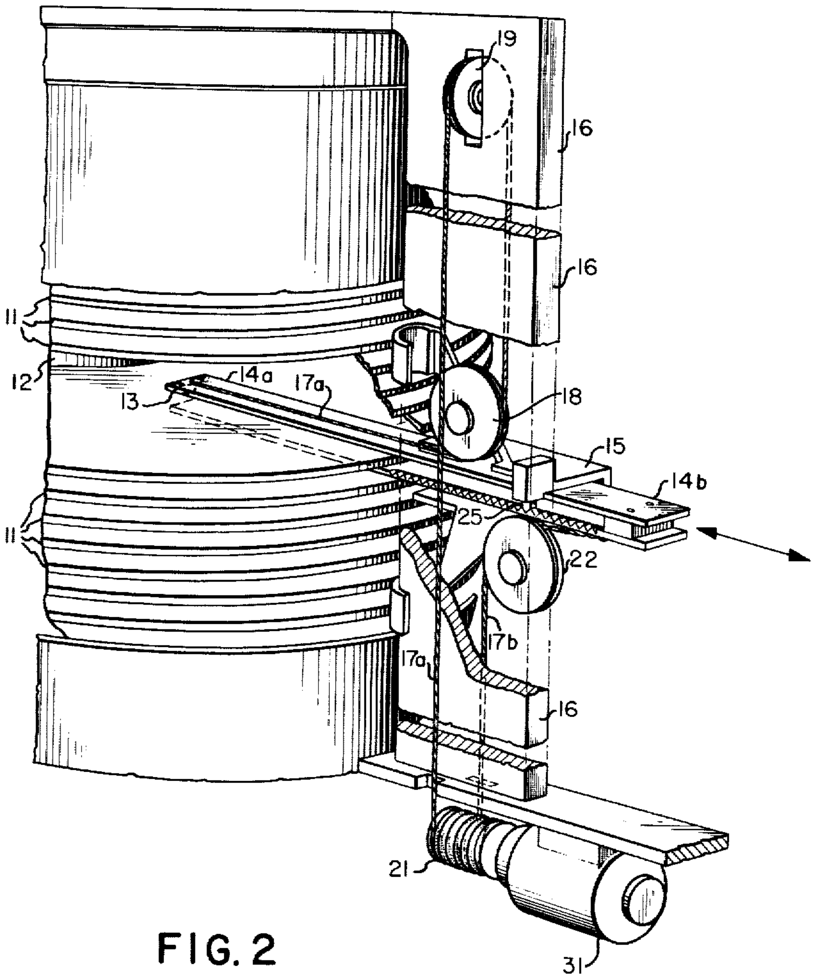

Objects and advantages other than those set forth above will be apparent from the following description when read in connection with the accompanying drawings, in which:

FIG. 1 diagrammatically illustrates apparatus in accordance with the preferred embodiment of the present invention for controlling the positioning of a transducer relative to different adjacent magnetic record tracks; and FIG. 2 is a perspective view, partly in section, illustrating magnetic recording apparatus utilizing a transducer which is positionable to a selected one of a plurality of tracks in accordance with the apparatus of FIG. 1.

Referring to FIG. 2 by character of reference, in accordance with the preferred embodiment the magnetic recording medium is illustrated in the form of a plurality of uniformly spaced discs 11 which are mounted on a vertically disposed shaft 12. Shaft 12 is driven by suitable means (not shown) to produce rotation of the discs 11. Each of discs 11 preferably has a magnetizable material on each of its two surfaces, and each of these surfaces of magnetizable material is preferably divided into a plurality of separate tracks or channels. Such tracks or channels will generally be in the form of concentric circles, as indicated by reference characters 11*a*, 11*b*, 11*c*, etc. (FIG. 1), and each of these channels represents a separate track on which data may be recorded and from which data may be reproduced.

To cooperate magnetically with the different tracks on the discs 11 there is provided a magnetic transducer 13 which is shown mounted in a movable arm 14. Arm 14 is slidably mounted for lateral movement within a carriage 15 which, in turn, is slidably mounted for vertical movement on a vertically disposed way 16. It will be sufficient for the purposes of the present invention to explain that carriage 15 is driven vertically and arm 14 is driven horizontally, as is necessary, to position the transducer 13 adjacent the desired record track. Carriage 15 and arm 14 may be driven by a pair of cables 17a and 17b. Cable 17a is secured to one end 14a of arm 14 and then extends over a sheave 18 upwardly to another sheave 19 and thence downwardly to a drive pulley 21. Cable 17b is secured to the underside of the other end 14b of arm 14 and extends over a sheave 22 to drive pulley 21. When drive pulley 21 rotates in one direction, cable 17a withdraws arm 14 outwardly from the center of the discs, and when pulley 21 rotates in the other direction, cable 17b drives arm 14 inwardly toward the center of the discs. Since the details of the arm mounting mechanism form no part of the present invention, the structure thereof is not shown in any further detail in the present application, although its operation should be clear from the foregoing description.

Drive pulley 21 is driven by a servo motor 31 which is controlled in accordance with the present invention to position the transducer horizontally to the desired one of the tracks 11a, 11b, etc. on discs 11. It will be understood that in the apparatus shown in FIG. 2, motor 31 will control both the vertical position of carriage 15 and the horizontal position of arm 14, but only the operation of motor 31 in controlling the positioning of arm 14 will be discussed in the present application. It will be seen from FIG. 2 that if arm 14 is fixed to resist movement relative to the carriage 15 and if arm 14 is clear of the discs 11, carriage 15 may be positioned along the way 16 under control of motor 31. Similarly, if carriage 15 is locked to the way 16 and arm 14 is free to move, motor 31 will drive arm 14 through cables 17a, 17b to the desired position.

It will also be apparent from FIG. 1 that to position a transducer to a given track on a given disc, motor 31 will first position carriage 15 vertically on way 16 to the vertical position representing the desired disc. During this vertical positioning operation, arm 14 will be completely withdrawn from discs 11 so that the carriage 15 and arm 14 may move freely vertically. After carriage 15 has reached the desired vertical position, the carriage is locked in position on way 16, and arm 14 is freed to move horizontally under the control of motor 31 to the desired position representing the selected track on the selected disc 11. Arm 14 may be locked in any position by means of a detent lug 25 on carriage 15 which is controllable to engage any one of a series of corresponding notches in arm 14. Detent lug 25 may be controlled in response to signals indicating that arm 14 is in the desired position, as will be described more fully below.

Referring now to FIG. 1, there is shown apparatus for controlling motor 31 so as to position transducer 13 to the desired track on the selected one of discs 11. This apparatus includes a network 51 which is designated as the address register and which generates a signal indicating the address of the desired track on the selected disc. The output pulse from address register 51 is supplied to a network 52 indicated as a control circuit which is actuated under the control of an external control signal from a conductor 53. When network 52 is actuated by the external control signal on conductor 53, it passes the address signal from network 51 to a track counter network 56 where the desired position of transducer 13, as represented by the signal from network 51, is compared with the actual position of the transducer.

The positioning cycle of transducer 13 may be controlled in any suitable manner. For example, the transducer may be positioned directly from one addressed track to the next addressed track by comparing the actual transducer position with the desired transducer position for each positioning operation. Alternatively, the transducer may be moved to a reference position, such as the outermost edge of the disc file, upon completion of a given positioning operation and prior to commencing the next positioning operation. This use of a reference position facilitates the counting of the tracks crossed by the transducer and permits the use of the address complement system described below. Counter network 56 is preset by the address signal from network 51 to a number representing the complement of the desired address. For example, if disc 11 has 100 tracks thereon, track counter 56 may be a counter which is designed to count to 100 and then produce an output or carry pulse. Counter 56 would then start its counting cycle over again. Thus, if it is desired to position transducer 13 to, say, track 45 on the selected disc, address register 51 would supply the 100's complement of this address, i.e., 55, to track counter 56 through control circuit 52. Track counter 56 would thus be preset to a count of 55 and would produce a carry pulse after 45 additional counts. This carry pulse may be supplied to suitable circuitry, such as a detent control circuit 57, which controls detent lug 25 to free and lock arm 14 relative to carriage 15.

Track counter 56 also receives an input signal indicating the number of tracks actually crossed by the transducer 13 and arm 14 in moving inwardly on disc 11. At the start of each separate positioning operation, arm 14 is automatically withdrawn to a reference position, such as at the outermost edge of the discs, so that the track counting may be performed accurately. As transducer 13 is driven across the different tracks on disc 11 by motor 31, the disc will be rotating under the transducer at a relatively high speed. The magnetic bits forming the recorded data on the different tracks will thus pass under transducer 13 at high speed to produce a series of output pulses from the transducer. There will be a group of pulses for each track crossed by the transducer, with the pulses in each group increasing in amplitude from zero at the edge of the track to a maximum value as the transducer reaches the middle of the track and then decreasing towards zero as the transducer reaches the other edge of the track. Each of these groups of pulses is amplified in an amplifier 61 and then preferably smoothed in an integrating network 62 to provide an output signal having an envelope which increases to a maximum value and then decreases again toward zero for each of the track crossings.

The output from integrating network 62 is supplied to a bistable trigger device 63 which switches to its opposite state when its input value rises to a critical value and then switches back to its original state when the input falls to a second critical value. Trigger 63 thus produces an output pulse for each track crossing signal from transducer 13, and this trigger output pulse is supplied through a conductor 64 as the other input to track counter 56. Each of these trigger output pulses constitutes an input pulse to track counter 56 to advance one count for each pulse.

Track counter 56, in addition to supplying a carry pulse to detent network 57 when the counter reaches its predetermined count also preferably provides a signal to a digital to analog converter network 66. This signal to converter 66 is a measure of the uncounted portion of the count cycle of counter 56, so that the output of converter 66 is an analog signal representing the uncounted portion of counter 56. For example, if track counter 56 has been preset to a count of 55 by the signal from address register 51, the uncounted portion of counter 56 cycle is 45, and a signal representing this uncounted portion is supplied to converter 66 where this signal is converted into a corresponding analog signal which is supplied to the drive motor 31. On the other hand, if the address of the desired track is, say, track 5, address register 51 supplies a signal of 95 through control circuit 52 to preset counter 56 to a count of the 100's complement of the address, i.e., 95. Under these circumstances, track counter 56 supplies a signal to converter 66 representing the uncounted portion, i.e., 5, of the counter cycle, so that the analog signal from converter 66 for this particular address has a much smaller amplitude than the signal supplied when the desired address is track 45. Thus, the output signal from converter 66 has an amplitude which is dependent upon the distance which transducer 13 and arm 14 must be driven to reach the desired address position. This arrangement provides damping in the system by providing a signal to drive motor 31 having an amplitude which is a measure of the distance transducer 13 and arm 14 must be driven.

The counter 56 may comprise any one of several well known types of counters; for example, several so-called Overbeck rings could be used. In the present embodiment wherein it is assumed that there are 100 tracks per disc face, two ten stage rings may be provided. Each ring may comprise ten trigger circuits connected in series, only one of which is in an "on" condition at a time. Each pulse to be counted is connected to the write order ring for advancing the "on" trigger around the ring. Every ten pulses causes a carry pulse to be generated from the units order counter which is applied to the tens order counter, every hundred pulses causing a carry from the tens order ring.

The converter 66 may comprise any suitable device for converting the condition of the counter 56 to a voltage which corresponds to the number of remaining tracks that the transducer must move. For example, a suitably coded resistive network connected to various stages of the rings of the counter 56 may connect to a common signal line for supplying voltages representative of the transducer position to servo motor 31. In the present embodiment wherein it is assumed that the counter is preset to the complement of the desired track address, it is desired that the voltage connected to the servo motor 31 decrease as the counter nears a condition representative of 100, since when the counter produces a carry, the transducer 13 is in the desired position. Accordingly, the various resistor values may be coded in such a way as to supply a maximum voltage to the servo motor 31 when the counter 56 indicates that the maximum number of tracks must be crossed prior to reaching the desired track, and that these values provide for a minimum voltage to the servo motor 31 when the counter 56 represents that only one track need be crossed.

In operation, assume that discs 11 are rotating and that it is desired to position transducer 13 at track 60 on its associated disc. At the start of the operation, arm 14 and transducer 13 have been withdrawn to their reference position on the outer edge of discs 11 by drive motor 31. The address of the desired track is supplied through address register 51 to counter 56 in the form of the 100's complement of the address, i.e., 40, when control circuit 52 is actuated by the external control signal on conductor 53. Counter 56 is thus preset to a count of 40 in its total count of 100, and then supplies a signal to converter 66 which is a measure of the uncounted portion of its cycle, i.e., 60. The analog signal from converter 66 is supplied to drive motor 31 to cause motor 31 to drive arm 14 and transducer 13 inwardly toward the center of the discs. As transducer 13 crosses each of these tracks, the track crossing pulses are supplied through amplifier 61 and integrator 62 to trigger circuit 63 to produce an output pulse from trigger 63 for each of the track crossings, in the manner described above. These output pulses are supplied through conductor 64 to one input of counter 56 where they serve to advance the counter one count for each pulse. Counter 56 thus counts from its original preset count of 40 and approaches its full count of 100 as transducer 13 crosses the different tracks in approaching the center of the disc array. It will be seen that as transducer 13 approaches the desired address, the uncounted portion of the cycle of counter 56 will decrease, thus decreasing the signal supplied to converter 66 and decreasing the signal from converter 66 to drive motor 31. Drive motor 31 thus decreases its output as transducer 13 approaches the desired track, to prevent overshooting or hunting in locating the desired track.

When counter 56 reaches its full count of one-hundred, which full count is reached after receipt of sixty pulses from trigger circuit 63, counter 56 supplies a carry pulse to the detent circuit 57 which actuates detent lug 25 to lock arm 14 in position over the desired track. Detent circuit 57 may also provide an "on-track" signal to other associated circuitry to indicate that the transducer is located over the desired track and that recording and/or reproducing may be commenced.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for positioning a transducer at a selected one of a plurality of adjacent tracks of magnetic data bit manifestations comprising: a transducer capable of reproducing magnetic data bit manifestations to be utilized to transmit the information contained therein and as an indication of the track position, counter means settable according to the position of said selected one of said tracks, driving means for driving said transducer transversely over said tracks, said transducer producing a series of data manifestations each time said transducer crosses one of said tracks, integrator means to produce a signal from said data manifestations produced by said transducer, means for supplying said signals from said integrator means to said counter means for comparison with the setting of said counter, and means for supplying a driving signal to said driving means, said driving signal having an amplitude which is a measure of the difference resulting from said comparison to position said transducer at the selected one of said tracks indicated by the setting of said counter means.

2. Apparatus for positioning a transducer at a selected one of a plurality of adjacent tracks of magnetic data bit manifestations comprising: a transducer capable of reproducing magnetic data bit manifestations to be utilized to transmit the information contained therein and as an indication of track position, cyclic counter means responsive to an address and operable to produce an output pulse at the end of its cycle when it has received a number of pulses equal to the number of said tracks, driving means for setting said counter means according to the complement of the address of said selected one of said tracks, driving means for driving said transducer transversely over said tracks, said transducer producing a series of data manifestations each time said transducer crosses one of said tracks, integrator means responsive to said data manifestations produced by said transducer to produce a pulse, means for supplying said pulses from said integrator means to said counter means for advancing the count of said counter, and means for supplying a driving signal to said driving means from said counter means which driving signal is a measure of the uncounted portion of said counter cycle to drive said transducer to said selected track.

3. Apparatus for positioning a transducer at a selected one of a plurality of adjacent tracks of magnetic data bit manifestations comprising: a transducer capable of reproducing magnetic data bit manifestations to be utilized to transmit the information contained therein and as an indication of track position, cyclic counter means responsive to an address and operable to produce an output pulse at the end of its cycle when it has received a number of pulses equal to the number of said tracks, means for setting said counter means according to the complement of the address of said selected one of said tracks, driving means for driving said transducer transversely over said tracks, said transducer producing a series of data manifestations each time said transducer crosses one of said tracks, integrator means responsive to said data manifestations produced by said transducer to produce a pulse, means for supplying said pulses from said integrator means to said counter means for advancing the count of said counter, and means for supplying a driving signal to said driving means from said counter means, said driving signal having an amplitude proportional to the uncounted portion of said counter cycle to drive said transducer to said selected track.

References Cited in the file of this patent

UNITED STATES PATENTS

| | | |
|---|---|---|
| 2,537,427 | Seid et al. | Jan. 9, 1951 |
| 2,674,728 | Potter | Apr. 6, 1954 |
| 2,727,194 | Seid | Dec. 13, 1955 |
| 2,914,752 | MacDonald | Nov. 24, 1959 |
| 2,928,033 | Abbott | Mar. 8, 1960 |

UNITED STATES PATENT OFFICE

CERTIFICATE OF CORRECTION

Patent No. 3,105,963 October 1, 1963

Louis D. Stevens et al.

It is hereby certified that error appears in the above numbered patent requiring correction and that the said Letters Patent should read as corrected below.

Column 6, line 52, strike out "driving".

Signed and sealed this 28th day of April 1964.

(SEAL)
Attest:
ERNEST W. SWIDER

Attesting Officer

EDWARD J. BRENNER
Commissioner of Patents